United States Patent
Lee (10) Patent No.: US 8,903,231 B2
(45) Date of Patent: Dec. 2, 2014

(54) IMAGE STABILIZING APPARATUS

(71) Applicant: Samsung Electronics Co., Ltd., Suwon-si, Gyeonggi-do (KR)

(72) Inventor: Kyung-bae Lee, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/023,803

(22) Filed: Sep. 11, 2013

(65) Prior Publication Data

US 2014/0010523 A1    Jan. 9, 2014

Related U.S. Application Data

(63) Continuation of application No. 13/288,093, filed on Nov. 3, 2011, now Pat. No. 8,542,988.

(30) Foreign Application Priority Data

Jun. 21, 2011    (KR) ........................ 10-2011-0060239

(51) Int. Cl.
*G03B 17/00* (2006.01)
*G03B 15/00* (2006.01)
*H04N 5/232* (2006.01)
*G03B 5/00* (2006.01)

(52) U.S. Cl.
CPC .............. *G03B 5/00* (2013.01); *H04N 5/23258* (2013.01); *G03B 2217/005* (2013.01); *G03B 2205/0015* (2013.01); *H04N 5/2328* (2013.01); *G03B 2205/0061* (2013.01)
USPC ...................................... 396/55; 348/208.11

(58) Field of Classification Search
CPC ..................................................... H02N 2/025
USPC .................................. 399/52, 55; 348/208.11
See application file for complete search history.

(56) References Cited

U.S. PATENT DOCUMENTS

| | | | |
|---|---|---|---|
| 6,005,723 A | 12/1999 | Kosaka et al. | |
| 7,085,484 B2 | 8/2006 | Hara | |
| 7,471,886 B2 | 12/2008 | Hirota et al. | |
| 7,501,741 B2 | 3/2009 | Naka et al. | |
| 7,567,017 B2 | 7/2009 | Yoon et al. | |
| 7,840,127 B2 | 11/2010 | Suzuki | |
| 2007/0035858 A1* | 2/2007 | Sasaki ........................... | 359/823 |
| 2007/0096601 A1* | 5/2007 | Sueyoshi et al. .............. | 310/328 |

* cited by examiner

FOREIGN PATENT DOCUMENTS

| | | | |
|---|---|---|---|
| JP | 2006-293083 A | | 10/2006 |
| JP | 3832396 B2 | | 10/2006 |
| JP | 2010063206 A | * | 3/2010 |

*Primary Examiner* — Clayton E LaBalle
*Assistant Examiner* — Leon W Rhodes, Jr.
(74) *Attorney, Agent, or Firm* — Drinker Biddle & Reath LLP (57) ABSTRACT

An image stabilizing apparatus includes: a base; a first frame movably coupled to the base in a first direction; a first vibration axis that movably support the first frame; a first vibration unit that vibrates the first vibration axis; a first sensing unit that senses a position variation of the first frame; a second frame movably coupled to the first frame in a second direction that crosses the first direction; a lens coupled to the second frame; a second vibration axis that is disposed on the first frame to movably support the second frame; a second vibration unit that vibrates the second vibration axis; a second sensing unit that senses a position variation of the second frame; and a first elastic plate including a connecting portion that is connected to the first frame and a pressing portion that is bent from the connecting portion and presses the first vibration axis.

20 Claims, 7 Drawing Sheets

IMAGE STABILIZING APPARATUS

CROSS-REFERENCE TO RELATED PATENT APPLICATION

This application is a continuation application of U.S. patent application Ser. No. 13/288,093, filed Nov. 3, 2011, which claims the priority benefit of Korean Patent Application No. 10-2011-0060239, filed on Jun. 21, 2011, in the Korean Intellectual Property Office, the disclosure of which is incorporated herein in its entirety by reference.

BACKGROUND

The present invention relates to image stabilizing apparatuses, and more particularly, to image stabilizing apparatuses in which a position of a lens may be precisely sensed and adjusted to correct a handshake.

An image stabilizing apparatus used in cameras prevents decrease in clarity of images due to a handshake of a user. In the image stabilizing apparatus, a power operated driving unit that changes a position of an optical element such as a lens is used. When the handshake correction function is not executed, the position of the optical element has to be fixed, and thus power is supplied to the driving unit to fix the position of the optical element. Thus, according to the conventional art, the driving unit for driving the optical element consumes power even when the handshake correction function is not executed.

SUMMARY

One or more embodiments of the present invention provide an image stabilizing apparatus in which a lens position is precisely adjusted to correct a handshake.

One or more embodiments of the present invention provide an image stabilizing apparatus in which power consumption is reduced.

One or more embodiments of the present invention provide an image stabilizing apparatus in which a lens position that is adjusted to correct a handshake is precisely sensed.

According to an embodiment of the present invention, there is provided an image stabilizing apparatus comprising: a base; a first frame that is movably coupled to the base in a first direction; a first vibration axis that is disposed on the base and extended along the first direction to movably support the first frame in the first direction; a first vibration unit that vibrates the first vibration axis; a first sensing unit that senses a position variation of the first frame; a second frame that is movably coupled to the first frame in a second direction that is perpendicular to the first direction; a lens coupled to the second frame; a second vibration axis that is disposed on the first frame and extended along the second direction to movably support the second frame along the second direction; a second vibration unit that vibrates the second vibration axis; and a second sensing unit for sensing a position variation of the second frame.

The first vibration unit and the second vibration unit may each include a piezoelectric device that is coupled to an end of the first vibration axis or the second vibration axis and generates vibration upon receiving an electrical signal.

The first frame may comprise a first slider that is extended from an outer portion of the first frame to contact the first vibration axis to be movable along the first vibration axis, and the second frame may comprise a second slider that is extended from an outer portion of the second frame to contact the second vibration axis to be movable along the second vibration axis.

The image stabilizing apparatus may further comprise a first elastic plate contacting the first vibration axis to press the first vibration axis toward the first slider and a second elastic plate contacting the second vibration axis to press the second vibration axis toward the second slider.

The first slider and the second slider may each include a contact surface surrounding a portion of an outer circumferential surface of the first vibration axis or the second vibration axis, and the image stabilizing apparatus may further comprise contact plates that have shapes corresponding to the contact surfaces of the first slider and the second slider and are disposed respectively between the first vibration axis and the first slider and between the second vibration axis and the second slider.

The contact surfaces may be curved to correspond to the outer circumferential surfaces of the first vibration axis and the second vibration axis, and the contact plates may be curved to correspond to the contact surfaces.

The contact plates may be bent to contact at least two points of the outer circumferential surface of the first vibration axis and the second vibration axis, and the contact surfaces may be formed to correspond to the contact plates.

A first end of the first vibration axis may be elastically coupled to the base, and a first end of the second vibration axis may be elastically coupled to the first frame.

The first ends of the first vibration axis and the second vibration axis may be respectively coupled to the base and the first frame using an elastic adhesive.

The image stabilizing apparatus may further comprise: a first rail that is installed on one of the base and the first frame to extend along the first direction; and a first moving unit that is installed on the other of the base and the first frame to be slidably coupled to the first rail.

The image stabilizing apparatus may further comprise: a second rail that is installed on one of the first frame and the second frame to extend along the second direction; and a second moving unit that is installed on the other of the first frame and the second frame to be slidably coupled to the second rail.

The first sensing unit and the second sensing unit may each comprise: a magnet that is disposed on one of the second frame and the base; and a magnetism sensing unit that is disposed on the other of the second frame and the base to correspond to the magnet and generates a signal by sensing a change in a magnetic force according to a position of the magnet.

The magnetism sensing unit may comprise a first sensor and a second sensor that are spaced apart in the first direction or the second direction.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown and described in more detail below.

Figure 1:
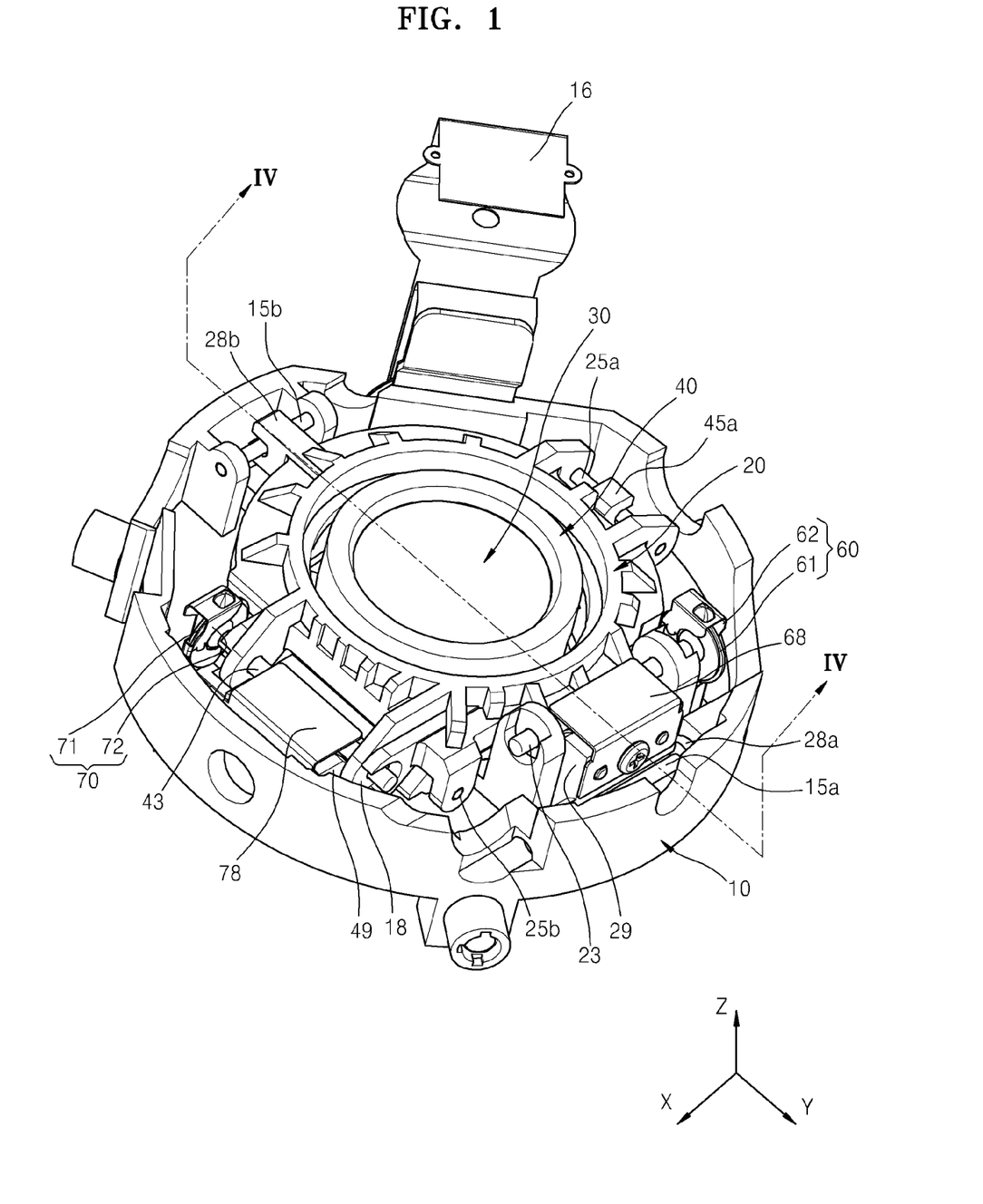
FIG. 1 is a perspective view illustrating an image stabilizing apparatus according to an embodiment of the present invention.
Figure 2:
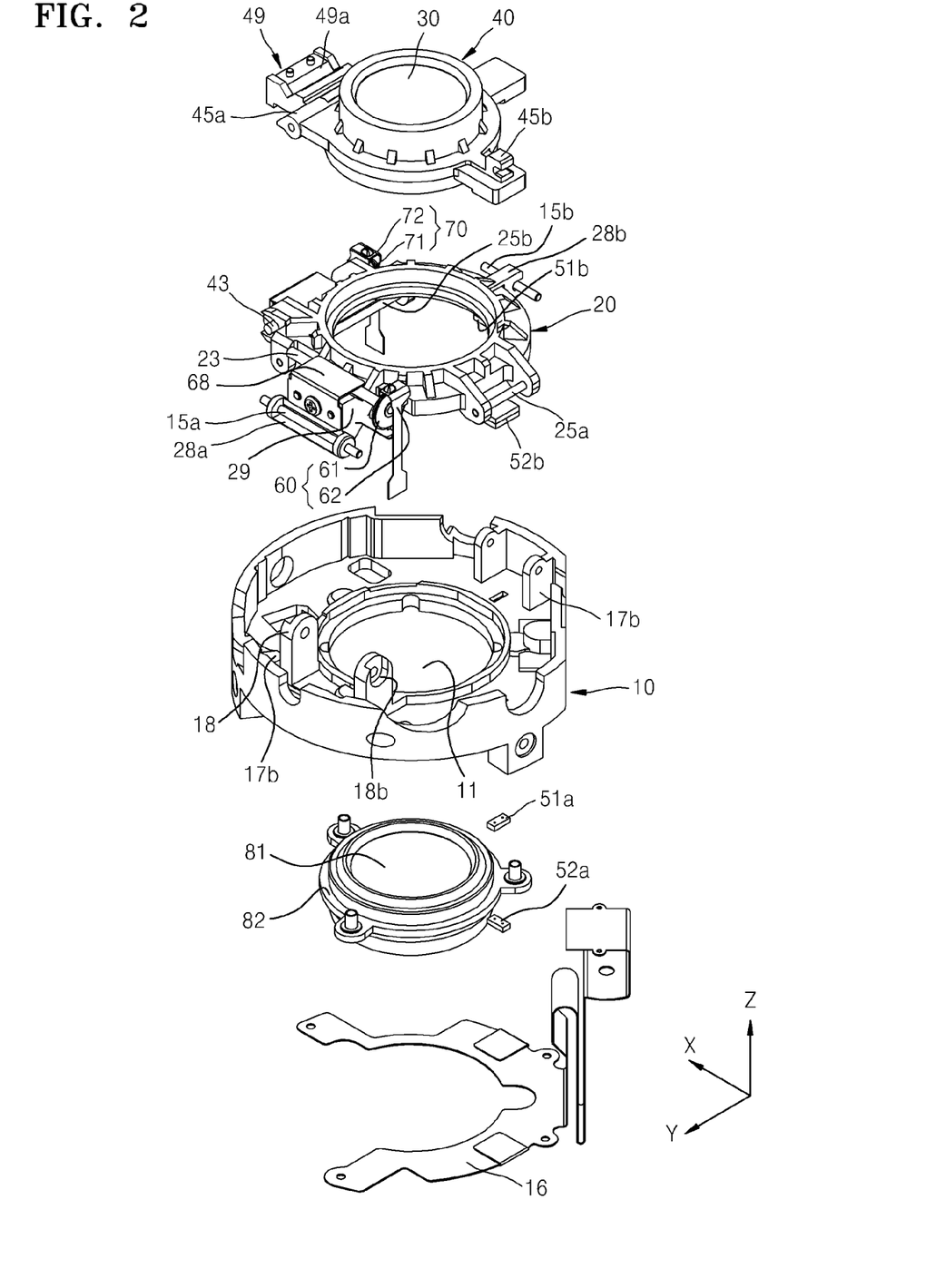
FIG. 2 is an exploded perspective view illustrating components of the image stabilizing apparatus of FIG. 1.

FIG. 1 is a perspective view illustrating an image stabilizing apparatus according to an embodiment of the present invention. FIG. 2 is a disassembled perspective view illustrating components of the image stabilizing apparatus of FIG. 1.

The image stabilizing apparatus includes a base 10, a first frame 20 that is movably disposed on the base 10, a first vibration axis 23 for movably supporting the first frame 20 in a first direction, a first vibration unit 60 for vibrating the first vibration axis 23, a first sensing unit (not shown) for sensing a change in a position of the first frame 20, a second frame 40 movably disposed on the first frame 20, a lens 30 coupled to the second frame 40, a second vibration axis 43 for movably supporting the second frame 40 in a second direction, a second vibration unit 70 for vibrating the second vibration axis 43, and a second sensing unit (not shown) for sensing a change in a position of the second frame 40. A specific configuration and arrangement of the first and second sensing units here not shown will be described below with reference to the following drawings.

The base 10 movably supports the first frame 20 in the first direction (X-axis direction), which is a direction that crosses a direction of an optical axis (Z-axis) passing through the lens 30, which is an optical element. The base 10 includes an opening portion 11 that the optical axis passes through and that is formed at a position corresponding to a position of the lens 30. A lens frame 82 for supporting the lens 81 may be coupled to the opening portion 11 of the base 10.

The first frame 20 is movably coupled to the base 10 in the first direction. The first frame 20 movably supports the second frame 40. The second frame 40 may be moved in the second direction (Y-axis direction), which is a direction that is perpendicular both the direction of the optical axis (Z-axis) and the first direction (X-axis direction). The second frame 40 supports the lens 30 by surrounding the same.

When images to be obtained by using an image picking device (not shown) are unclear due to vibration such as a handshake, the first frame 20 is moved in the first direction or the second frame 40 is moved in the second direction to correct the handshake, thereby making the images to be obtained by the image picking device (not shown) clear.

The first vibration axis 23 extending along the first direction is disposed on the base 10. The first vibration axis 23 movably supports the first frame 20 in the first direction with respect to the base 10, and vibrates to expand and contract in the first direction, thereby moving the first frame 20 in the first direction.

First rails 15a and 15b extending along the first direction are disposed on the base 10. The first rails 15a and 15b are coupled to rail supporting units 17a and 17b of the base 10, thereby movably supporting the first frame 20 in the first direction.

First moving units 28a and 28b that are respectively slidably coupled to the first rails 15a and 15b are installed on the first frame 20. The first moving units 28a and 28b are installed to protrude from outer portions of the first frame 20.

The current embodiment of the present invention is not limited to the first rails 15a and 15b and the first moving units 28a and 28b installed to movably couple the first frame 20 to the base 10 in the first direction. For example, the first rails 15a and 15b may be installed on the first frame 20, and the first moving units 28a and 28b may be installed on the base 10. Also, the first rails 15a and 15b may have a rectangular cross-section or a groove shape instead of the illustrated cylinder pipe shape.

The second vibration axis 43 extending along the second direction is disposed on the first frame 20. The second vibration axis 43 movably supports the second frame 40 in the second direction with respect to the first frame 20, and vibrates to expand and contract in the second direction, thereby moving the second frame 40 in the second direction.

Second rails 25a and 25b extending along the second direction are disposed on the first frame 20. The second rails 25a and 25b movably support the second frame 40 in the second direction.

Second moving units 45a and 45b that are slidably coupled to the second rails 25a and 25b are installed on the second frame 40. The second moving units 45a and 45b are installed to protrude from outer portions of the second frame 40.

The current embodiment of the present invention is not limited to the second rails 25a and 25b and the second moving units 45a and 45b. For example, the second rails 25a and 25b may be installed on the second frame 40, and the second moving units 45a and 45b may be installed on the first frame 20. Also, for example, the second rails 25a and 25b may be formed to have a rectangular cross-section or may be formed by forming a groove in an external surface of the first frame 20.

The first vibration unit 60 and the second vibration unit 70 are respectively coupled to first end portions of the first vibration axis 23 and the second vibration axis 43. The first vibration unit 60 and the second vibration unit 70 generate vibration by using an electrical signal applied from an external controller (not shown) to respectively vibrate the first vibration axis 23 and the second vibration axis 43, thereby moving the first frame 20 and the second frame 40, respectively.

The first vibration unit 60 includes a piezoelectric device 61 and a flexible substrate 62 that transmits an electrical signal to the piezoelectric device 61. The first vibration unit 60 is installed in a mounting groove 18b of the base 10, as illustrated in FIG. 2.

The second vibration unit 70 also includes a piezoelectric device 71 and a flexible substrate 72 that transmits an electrical signal to the piezoelectric device 71. While a specific position of the second vibration unit 70 installed on the first frame 20 is not shown, the second vibration unit 70 is installed on the first frame 20 in a similar manner as the first vibration unit 60 installed on the base 10.

The flexible substrates 62 and 72 of the first vibration unit 60 and the second vibration unit 70 are respectively connected to a main flexible substrate 16 that is coupled to the base 10 to receive an electrical signal applied from the external controller (not shown) via the main flexible substrate 16.

Figure 3:
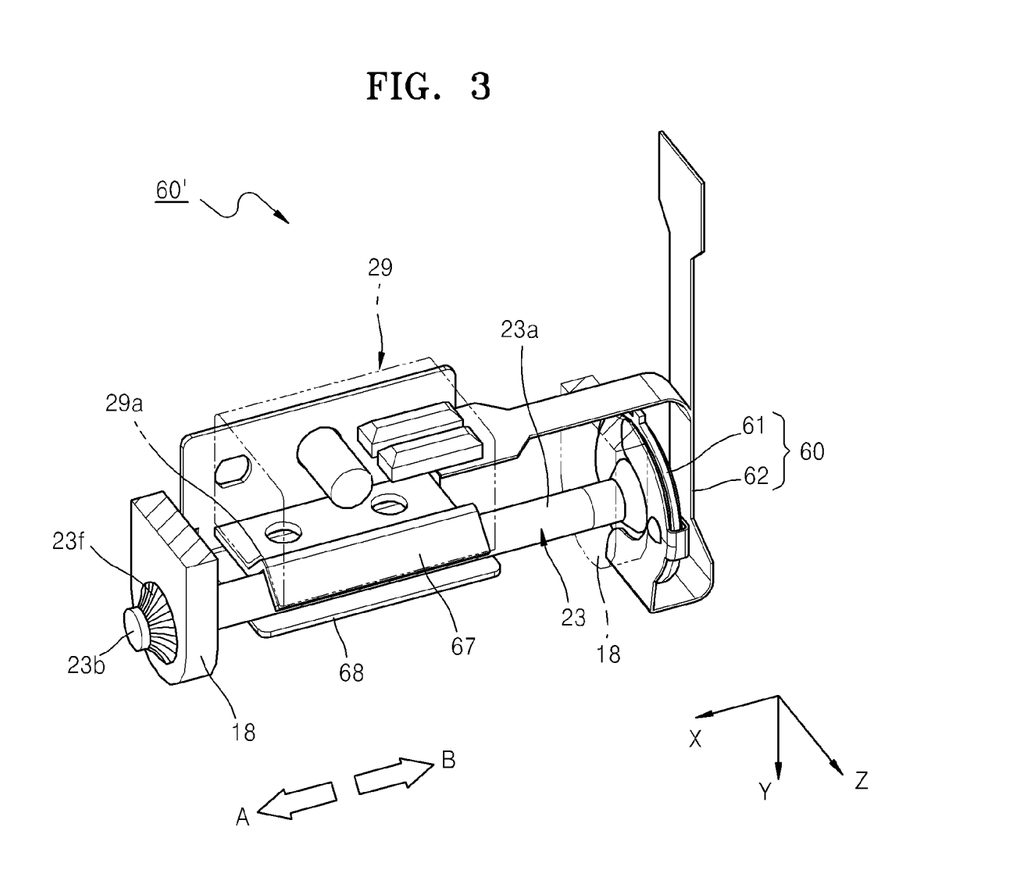
FIG. 3 is a perspective view illustrating an actuator of the image stabilizing apparatus of FIG. 1, according to an embodiment of the present invention.

FIG. 3 is a perspective view illustrating an actuator of the image stabilizing apparatus of FIG. 1, according to an embodiment of the present invention.

The actuator, which moves the first frame 20 and the second frame 40, has a configuration as illustrated in FIG. 3. Since the configurations of the first vibration unit 60 and the second vibration unit 70 are similar, descriptions with reference to FIG. 3 will focus on only an actuator 60' including the first vibration unit 60.

The actuator 60', which moves the first frame 20, includes the first vibration axis 23, which extends along the first direction (X-axis direction), the first vibration unit 60, which is disposed at a first end portion 23a of the first vibration axis 23, and a first slider 29 that contacts an outer portion of the first vibration axis 23 and is movable along the first vibration axis 23 in the first direction.

The first vibration unit 60 includes the piezoelectric device 61 and the flexible substrate 62, which transmits an electrical signal to the piezoelectric device 61.

The piezoelectric device 61, which operates according to a piezoelectric effect, may be a stacked type piezoelectric device formed by stacking a plurality of electrodes or a single-layer piezoelectric device; when an alternating current (AC) is applied to the piezoelectric device 61, the piezoelectric device 61 generates vibration according to a driving waveform of the applied current. A subcompact actuator may be implemented by using the piezoelectric device 61, and by driving the actuator at a low speed, a high torque may be obtained, and a precisely controlled amount of kinetic energy may be provided to a mechanical system by using the actuator.

Two ends of the first vibration axis 23 are supported by an axis supporting unit 18 installed on the base 10. A second end portion 23b of the first vibration axis 23 is elastically coupled to the axis supporting unit 18. In order to elastically couple the second end portion 23b of the first vibration axis 23 to the axis supporting unit 18, the second end portion 23b is coated with an elastic adhesive 23f. The elastic adhesive 23f may be, for example, an ultraviolet curing resin (UV resin).

While the elastic adhesive 23f is used to elastically couple the second end portion 23b of the first vibration axis 23 to the axis supporting unit 18 in the embodiment of FIG. 3, the embodiment of the present invention is not limited thereto. For example, an elastic member formed of a material such as rubber or an elastic resin may be interposed between the first vibration axis 23 and the axis supporting unit 18.

While the first end portion 23a of the first vibration axis 23 is fixed with respect to the base 10 by the axis supporting unit 18, the second end portion 23b of the first vibration axis 23 is elastically supported by the elastic adhesive 23f. Accordingly, when the first vibration axis 23 vibrates by expanding and contracting along the X-axis direction, the second end portion 23b of the first vibration axis 23 may move a predetermined distance in an arrow direction A or in an arrow direction B along the X-axis direction.

Here, the expanding and contracting vibration of the first vibration axis 23 does not mean that the first vibration axis 23, which is a rigid body, expands or contracts in length, but that the position of the first vibration axis 23 changes along the X-axis direction according to curve-like vibration of the piezoelectric device 61 along the X-axis direction.

Referring to FIG. 2, the first slider 29 is installed on the first frame 20 to extend from an outer portion of the first frame 20, and slides along the first vibration axis 23 by contacting the first vibration axis 23.

The actuator 60' includes a first elastic plate 68 that contacts the first vibration axis 23 and presses the same toward the first slider 29. A first end portion of the first elastic plate 68 is coupled to an outer portion of the first slider 29, and a second end portion of the first elastic plate 68 contacts an outer portion of the first vibration axis 23, thereby maintaining a predetermined elastic force between the first vibration axis 23 and the first slider 29.

The actuator 60' also includes a contact plate 67 disposed between the first slider 29 and the first vibration axis 23. The contact plate 67 is bent to contact at least two portions of an outer circumferential surface of the first vibration axis 23. The first slider 29 includes a contact surface 29a that is formed to correspond to the shape of the contact plate 67.

Referring to FIG. 2, the second frame 40 includes a second slider 49. The second slider 49 is installed in an outer portion of the second frame 40 to extend from the outer portion of the second frame 40, and contacts the second vibration axis 43 to slide along the second vibration axis 43.

Like the first slider 29, the second slider 49 also includes a contact surface 49a formed toward the second vibration axis 43. Also, referring to FIG. 1, a second elastic plate 78 that applies a predetermined elastic force by pressing the second vibration axis 43 toward the second slider 49 is installed in an outer portion of the second slider 49.

As a predetermined elastic force is maintained between the first vibration axis 23 and the first slider 29 by using the first elastic plate 68, the first slider 29 may move in the direction A or in the direction B along the first vibration axis 23 according to vibration of the first vibration axis 23 by changing a duty cycle ratio of an electrical signal applied to the piezoelectric device 61.

Figure 4:
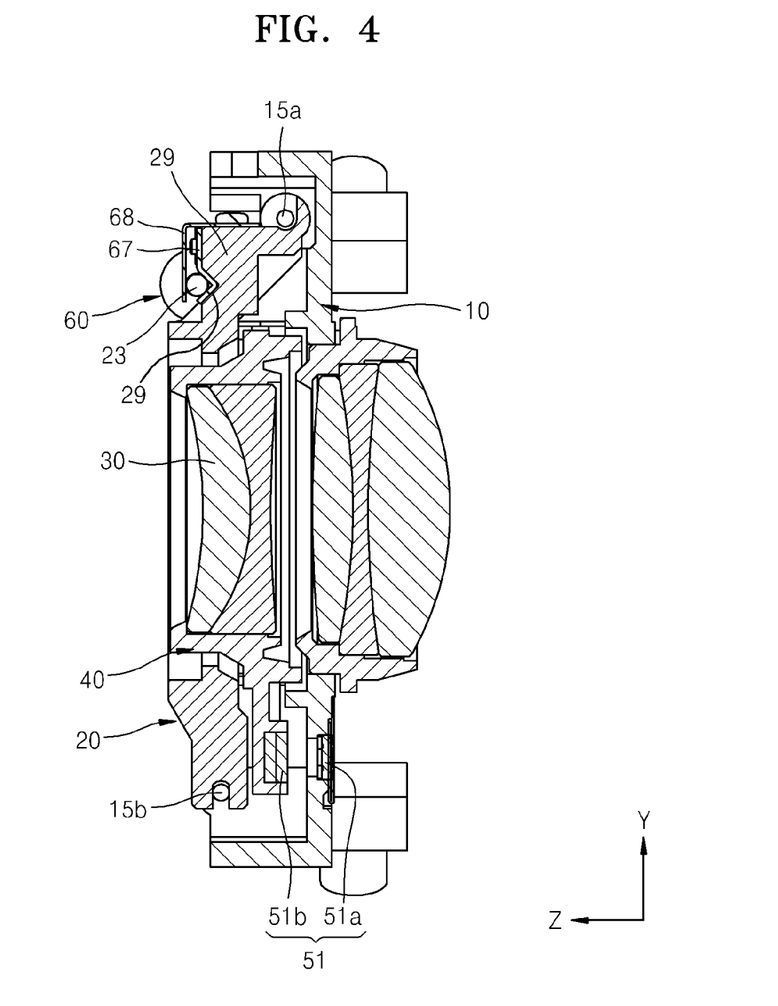
FIG. 4 is a cross-sectional view illustrating the image stabilizing apparatus of FIG. 1 cut along a line IV-IV, according to an embodiment of the present invention.
Figure 5:
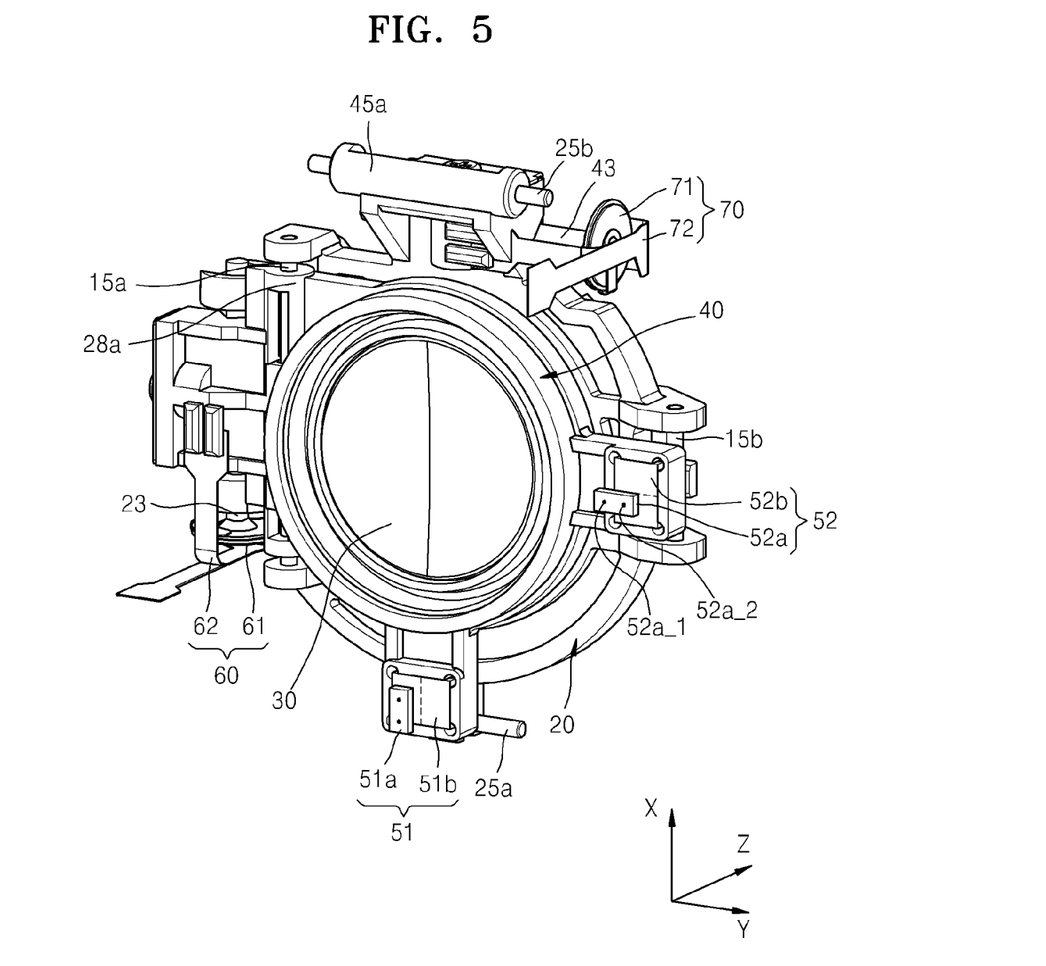
FIG. 5 is a perspective view illustrating rear surfaces of some components of the image stabilizing apparatus of FIG. 1, according to an embodiment of the present invention.

FIG. 4 is a cross-sectional view illustrating the image stabilizing apparatus of FIG. 1 cut along a line IV-IV, according to an embodiment of the present invention. FIG. 5 is a perspective view illustrating rear surfaces of some components of the image stabilizing apparatus of FIG. 1, according to an embodiment of the present invention.

A first sensing unit 52 that senses a position variation of the second frame 40 in the first direction with respect to the base 10 includes a magnet 52b disposed on the second frame 40 and a magnetism sensing unit 52a that is disposed on the base 10 to correspond to the magnet 52b and generates a signal by sensing a change in a magnetic force according to a position of the magnet 52b.

In addition, a second sensing unit 51 that senses a position variation of the second frame 40 in the second direction with respect to the base 10 includes a magnet 51b disposed on the second frame 40 and a magnetism sensing unit 51a that is disposed on the base 10 to correspond to the magnet 51b and generates a signal by sensing a change in a magnetic force according to a position of the magnet 51b.

The embodiment of the present invention is not limited to disposing the magnetism sensing units 51a and 52a and the magnets 51b and 52b on the positions described above; for example, the magnets 51b and 52b may be installed on the base 10 and the magnetism sensing units 51a and 52b may be installed on the second frame 40.

Hall sensors that output an electrical signal proportional to an external magnetic field by using the Hall effect may be used as the magnetism sensing units 51a and 52a. The magnetism sensing unit 52a, which senses a position variation of the second frame 40 in the first direction may include two Hall sensors 52a_1 and 52a_2. The two Hall sensors 52a_1 and 52a_2 are spaced apart in the second direction.

The magnetism sensing unit 51a, which senses a position variation of the second frame 40 in the second direction also includes two Hall sensors 51a1 and 51a_2. The two Hall sensors 51a_1 and 51a_2 are spaced apart in the first direction.

Although a position variation of the second frame 40 may be sensed by disposing just one Hall sensor, the position variation of the second frame 40 may be precisely sensed by disposing two Hall sensors spaced apart in the first direction or the second direction. As described above, by disposing two Hall sensors and spacing them apart, problems such as a change of an output value of a Hall sensor due to a temperature change may be dealt with more efficiently.

If only one sensing unit is installed to sense a position variation of the lens 30 with respect to the first direction only, even when the positions of the lens 30 and the components supporting the lens 30 vary due to inertia, position variations of the lens 30 in other directions may not be sensed. However, according to the current embodiment illustrated in FIG. 4, a position variation of the lens 30 in the first direction may be sensed by using the first sensing unit 52, and a position variation of the lens 30 in the second direction may be sensed by using the second sensing unit 51, thereby sensing a position variation of the lens 30 with respect to the optical axis with high reliability.

According to the conventional art, an image stabilizing apparatus is implemented using a voice coil motor (VCM). However, according to the conventional art, it is inconvenient as power needs to be supplied to the VCM or an instrument needs to be additionally installed to fix a lens to prevent shaking of the lens when the image stabilizing apparatus is not driven.

However, according to the image stabilizing apparatus having the above-described configuration, a predetermined elastic force between the first vibration axis 23 and the first frame 20 is always maintained, and a predetermined elastic force between the second vibration axis 43 and the second frame 40 is always maintained. Thus, power consumption may be reduced, and there is no need to install an instrument to fix the lens 30 because the position of the lens 30 may be maintained due to the elastic forces even while the image stabilizing apparatus is not driven.

Figure 6:
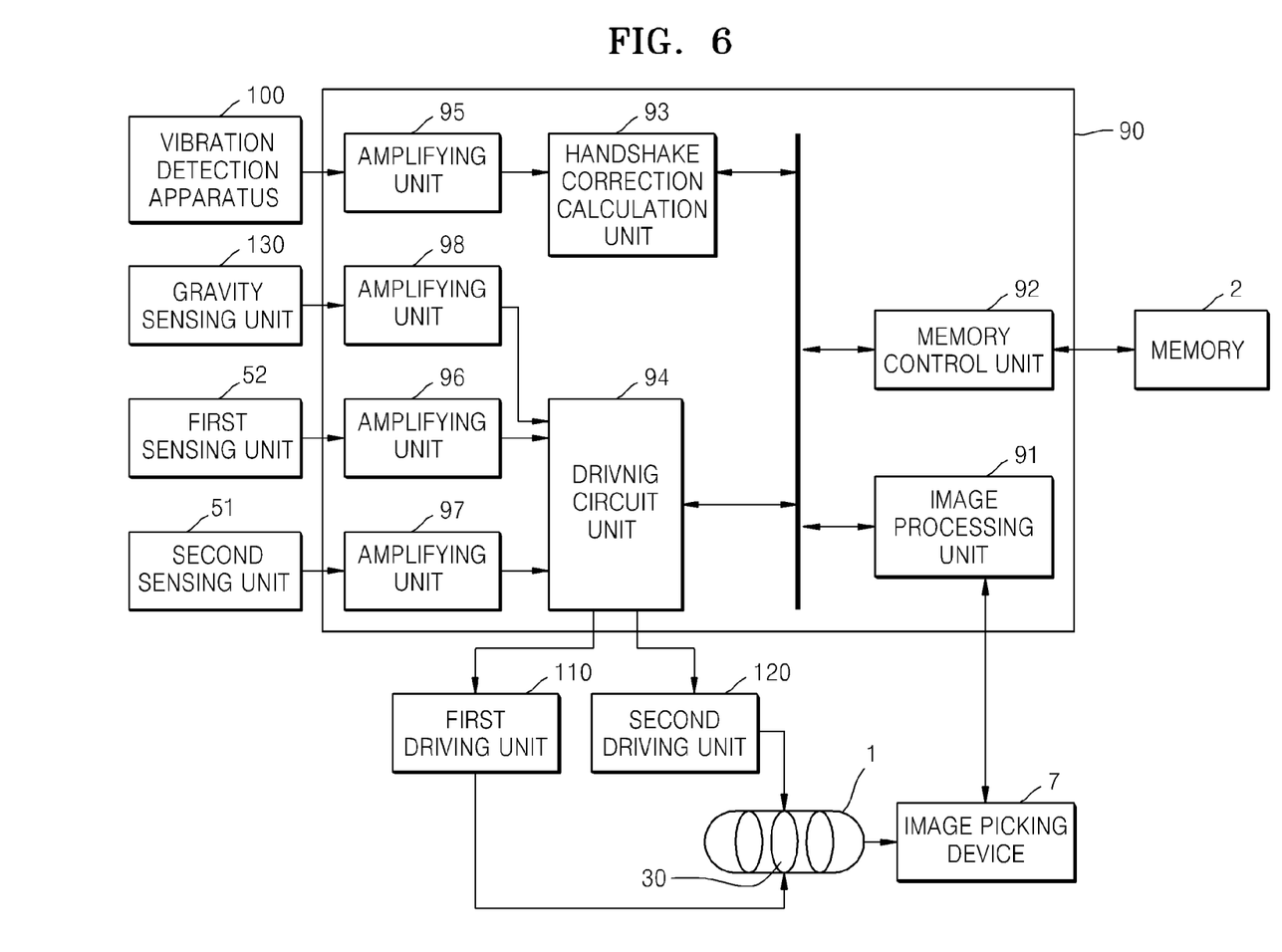
FIG. 6 is a schematic block diagram illustrating a relationship between components of an image capturing apparatus using the image stabilizing apparatus of FIG. 1.

FIG. 6 is a schematic block diagram illustrating a relationship between components of an image capturing apparatus using the image stabilizing apparatus of FIG. 1.

A controller 90 is electrically connected to various components such as an image pickup device 7, a first driving unit 110, a second driving unit 120, the first sensing unit 52, the second sensing unit 51, a vibration detection apparatus 100, and a gravity sensor unit 130, and transmits or receives a control signal to or from these components to control functions of the components or processes data.

The first driving unit 110 applies a control signal to the piezoelectric device 61 of the first vibration unit 60 of FIG. 1, and the second driving unit 120 applies a control signal to the piezoelectric device 71 of the second vibration unit 70. Accordingly, the controller 90 controls the first vibration unit 60 and the second vibration unit 70 to control a relative position of the lens 30 with respect to the base 10.

The controller 90 includes an image processing unit 91, a memory control unit 92, a handshake correction calculation unit 93, a driving circuit unit 94, and a plurality of amplifying units 95, 96, 97, and 98.

The image picking device 7 receives image light of a subject to generate an image signal, that is, an electrical signal. The image processing unit 91 of the controller 90 converts an image signal received from the image picking device 7 to image data representing an image. The image data converted by the image processing unit 91 may be stored in a memory 2 via the memory control unit 92.

The handshake correction calculation unit 93 is connected to the vibration detecting unit 100 via the amplifying unit 95. The vibration detection apparatus 100 may detect vibration due to, for example, a handshake. For example, a gyro sensor for detecting a displacement generated due to a handshake may be used as the vibration detection apparatus 100. Accordingly, the handshake correction calculation unit 93 calculates a correction amount to move the position of the lens 30 to correct the handshake, based on a detection result of the vibration detection apparatus 100.

A signal of the first sensing unit 52 is input to the driving circuit unit 94 of the controller 90 via the amplifying unit 96, and a signal of the second sensing unit 51 is also input to the driving circuit unit 94 via the amplifying unit 97. As illustrated in FIGS. 1 through 5, the first sensing unit 52 detects the position of the second frame 40 in the first direction (X-axis direction) with respect to the base 10 and the second sensing unit 51 detects the position of the second frame 40 in the second direction (Y-axis direction) with respect to the base 10.

Accordingly, the driving circuit unit 94 may check the position of the lens 30 in the first direction based on a detection result of the first sensing unit 52, and the position of the lens 30 in the second direction based on a detection result of the second sensing unit 51.

The driving circuit unit 94 determines a driving amount for moving the lens 30 in the first direction or the second direction based on detection results of the first sensing unit 52 and the second sensing unit 51 and a calculation result of the handshake correction calculation unit 93, and transmits a driving signal to the first driving unit 110 and the second driving unit 120. Accordingly, as the position of the lens 30 is adjusted by the first driving unit 110 and the second driving unit 120, a handshake generated while using an image capturing apparatus may be effectively corrected.

Figure 7:
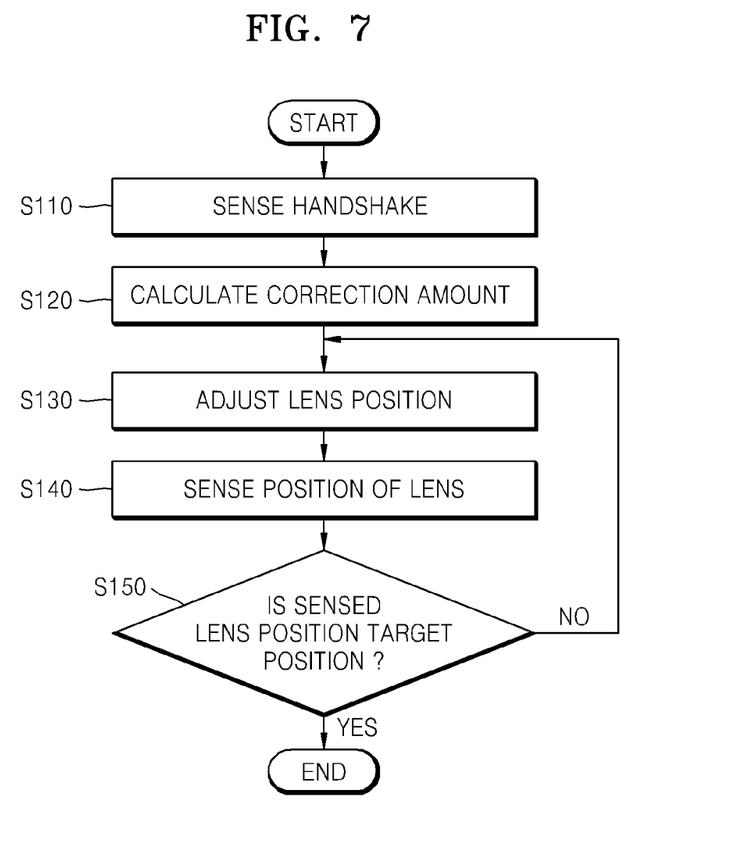
FIG. 7 is a flowchart illustrating a method of correcting handshake by using the image stabilizing apparatus of FIG. 1, according to an embodiment of the present invention.

FIG. 7 is a flowchart illustrating a method of correcting a handshake by using the image stabilizing apparatus of FIG. 1, according to an embodiment of the present invention.

The method of correcting a handshake includes sensing a handshake (S110), calculating a correction amount (S120), adjusting a position of a lens 30 by moving a second frame 40 (S130), sensing a position of the second frame 40 (S140), and checking the position of the lens 30 (S150).

When the image stabilizing apparatus executes a handshake correction function, the operations illustrated in FIG. 7 are sequentially performed. In the handshake sensing operation of S110, a condition where correction by adjusting a position of a lens is required as vibration due to a handshake is caused. When a handshake is sensed, a position correction amount for adjusting the position of the lens is calculated in operation S120.

After the correction amount is calculated, the position of the lens 30 is adjusted in operation S130. In operation S140, after the position adjustment is finished, the current position of the lens is sensed. Whether the position adjustment of the lens has been accurately performed is determined based on the sensed current position of the lens in operation S150, and if the sensed current lens position is a target position, it is determined that an accurate adjustment has been performed and thus the handshake correction function is completed. If the sensed current lens position is different from the target position, operation S130 of adjusting the position of the lens and the subsequent operations are performed again.

According to the image stabilizing apparatus according to the embodiments of the present invention described above, a lens position may be adjusted using a first vibration axis vibrating in a first direction and a second vibration axis vibrating in a second direction, and thus the lens position may be precisely adjusted. Also, by using a first sensing unit and a second sensing unit, changes of the lens position in the first direction and the second direction may be precisely sensed. In addition, as components coupled to the first vibration axis and the second vibration axis maintain predetermined elastic forces, power consumption may be reduced while a handshake correction function is not executed.

The device described herein may comprise a processor, a memory for storing program data and executing it, a permanent storage such as a disk drive, a communications port for handling communications with external devices, and user interface devices, such as a touch panel, keys, buttons, etc. Methods that are implemented using software modules or algorithms may be stored as computer readable codes or program instructions executable on the processor on non-transitory computer readable recording media. Examples of the computer readable recording media include magnetic storage media (e.g., read-only memory (ROM), random-access memory (RAM), floppy disks, hard disks, etc.) and optical recording media (e.g., CD-ROMs, DVDs, etc.). The computer readable recording media can also be distributed over network coupled computer systems so that the computer readable code is stored and executed in a distributed fashion. This media can be read by a computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines, or other programming elements. Functional aspects may be implemented in algorithms that execute on one or more processors. Furthermore, the present invention could employ any number of conventional techniques for electronics configuration, signal processing and/or control, data processing, and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development, and other functional aspects of systems (and components of individual operating components of systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections, or logical connections may be present in a practical device. Moreover, no item or component is essential to the practice of the invention unless the element is specifically described as "essential" or "critical". The terms "comprising" and/or "including" used herein are to be understood as terms indicating open-type terminating sections of the technology.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. An image stabilizing apparatus comprising:
a base;
a first frame that is movably coupled to the base in a first direction;
a first vibration axis that extends along the first direction to movably support the first frame in the first direction;
a first vibration unit that vibrates the first vibration axis;
a second frame that is movably coupled to the first frame in a second direction that crosses the first direction;
a lens coupled to the second frame;
a second vibration axis that is disposed on the first frame and extended along the second direction to movably support the second frame along the second direction;
a second vibration unit that vibrates the second vibration axis;
a sensing unit that senses a position variation of a sensed frame that is either the first frame or the second frame;
a first elastic plate comprising a first connecting portion that is connected to the first frame, and a first pressing portion that is bent from the first connecting portion and contacts and presses the first vibration axis; and
a first contact plate that contacts the first connecting portion of the first elastic plate;
a magnet disposed on one of the sensed frame and the base; and
a magnetism sensing unit that is disposed on the other of the sensed frame and the base to correspond to the magnet and that generates a sensing signal by sensing a change in a magnetic force according to a position of the magnet,
wherein:
the sensing unit senses position variation of the sensed frame with respect to the base in a sensed frame moving direction; and
the magnetism sensing unit comprises two sensors spaced apart.

2. The image stabilizing apparatus of claim 1, further comprising:
a first slider disposed on the first frame and extends along an outer portion of the first frame; and
the first contact plate is disposed between the first slider and the first vibration axis.

3. The image stabilizing apparatus of claim 2, wherein:
the first connecting portion of the first elastic plate is coupled to an outer portion of the first slider;
the first contact plate includes a bent portion to contact an outer circumferential surface of the first vibration axis; and
the first slider includes a contact surface that is formed to correspond to the bent portion of the first contact plate.

4. The image stabilizing apparatus of claim 1, further comprising:
a second elastic plate comprising a second connecting portion that is connected to the second frame and a second pressing portion that is bent from the second connecting portion and presses the second vibration axis.

5. The image stabilizing apparatus of claim 4, further comprising:
a second slider disposed on the second frame and extends along an outer portion of the second frame; and
a second contact plate disposed between the second slider and the second vibration axis.

6. The image stabilizing apparatus of claim 5, wherein:
the second connecting portion of the second elastic plate is coupled to an outer portion of the second slider;
the second contact plate includes a bent portion to contact an outer circumferential surface of the second vibration axis; and
the second slider includes a contact surface that is formed to correspond to the bent portion of the second contact plate.

7. The image stabilizing apparatus of claim 1, further comprising:
a first rail supporting unit disposed on the base; and
a first rail coupled to the first rail supporting unit to movably support the first frame in the first direction.

8. The image stabilizing apparatus of claim 7, further comprising:
a first moving unit that protrudes outwardly from the first frame and is slidably coupled to the first rail.

9. The image stabilizing apparatus of claim 1, further comprising:
a second rail disposed on the first frame to movably support the second frame in the second direction.

10. The image stabilizing apparatus of claim 9, further comprising:
a second moving unit that protrudes outwardly from the second frame and is slidably coupled to the second rail.

11. The image stabilizing apparatus of claim 1, wherein the first vibration unit is coupled to a first end portion of the first vibration axis, and the second vibration unit is coupled to a first end portion of the second vibration axis.

12. The image stabilizing apparatus of claim 1, wherein the first vibration unit is disposed in a mounting groove of the base, and the second vibration unit is disposed in a mounting groove of the first frame.

13. The image stabilizing apparatus of claim 1, wherein the first vibration unit comprises a first piezoelectric device, and the second vibration unit comprises a second piezoelectric device.

14. The image stabilizing apparatus of claim 1, further comprising:
an axis supporting unit disposed on the base that supports two ends of the first vibration axis.

15. The image stabilizing apparatus of claim 14, wherein a first end portion of the first vibration axis is fixedly coupled to the axis supporting unit, and a second end portion of the first vibration axis is elastically coupled to the axis supporting unit.

16. The image stabilizing apparatus of claim 1, wherein the two sensors of the magnetism sensing unit are spaced apart in a direction that is perpendicular to the sensed frame moving direction.

17. The image stabilizing unit of claim 1, further comprising:
a second sensing unit that senses a position variation of an other sensed frame that is not the sensed frame;
wherein the second sensing unit comprises:
a second magnet disposed on one of the other sensed frame and the base; and
a second magnetism sensing unit that is disposed on the other of the other sensed frame and the base to correspond to the second magnet and that generates a sensing signal by sensing a change in a magnetic force according to a position of the second magnet,
wherein the second sensing unit senses position variation of the other sensed frame with respect to the base in an other sensed frame moving direction.

18. The image stabilizing unit of claim 17, wherein the second magnetism sensing unit comprises two sensors spaced apart.

19. The image stabilizing apparatus of claim 18, wherein the two sensors of the second magnetism sensing unit are spaced apart in a direction that is perpendicular to the other sensed frame moving direction.

20. An image stabilizing apparatus comprising:
a base;
a first frame that is movably coupled to the base in a first direction;
a first vibration axis that extends along the first direction to movably support the first frame in the first direction;
a first vibration unit that vibrates the first vibration axis;
a second frame that is movably coupled to the first frame in a second direction that crosses the first direction;
a lens coupled to the second frame;
a second vibration axis that is disposed on the first frame and extended along the second direction to movably support the second frame along the second direction;
a second vibration unit that vibrates the second vibration axis;
a sensing unit that senses a position variation of a sensed frame that is either the first frame or the second frame;
a first elastic plate comprising a first connecting portion that is connected to the first frame and a first pressing portion that is bent from the first connecting portion and presses the first vibration axis; and
a first contact plate having a portion that is substantially parallel to the first pressing portion of the first elastic plate;
a magnet disposed on one of the sensed frame and the base; and
a magnetism sensing unit that is disposed on the other of the sensed frame and the base to correspond to the magnet and that generates a sensing signal by sensing a change in a magnetic force according to a position of the magnet, wherein:
   the sensing unit senses position variation of the sensed frame with respect to the base in a sensed frame moving direction; and
   the magnetism sensing unit comprises two sensors spaced 5 apart.

* * * * *